US012658624B2

(12) United States Patent
Sanchez Rojas et al.

(10) Patent No.: US 12,658,624 B2
(45) Date of Patent: Jun. 16, 2026

(54) RECEPTACLE TERMINAL

(71) Applicant: INTEVA PRODUCTS, LLC, Troy, MI (US)

(72) Inventors: Hector Sanchez Rojas, Chihuahua (MX); Pedro Alvarado Heredia, Chihuahua (MX); Miguel Angel Baray Gonzalez, Chihuahua (MX); Sergio Aviña Amparan, Chihuahua (MX); Alma Granados Arenas, Chihuahua (MX); Donglin Xu, Shanghai (CN)

(73) Assignee: INTEVA PRODUCTS, LLC, Troy, MI (US)

( * ) Notice: Subject to any disclaimer, the term of this patent is extended or adjusted under 35 U.S.C. 154(b) by 417 days.

(21) Appl. No.: 18/210,881

(22) Filed: Jun. 16, 2023

(65) Prior Publication Data

US 2023/0406050 A1 Dec. 21, 2023

(30) Foreign Application Priority Data

Jun. 17, 2022 (CN) ......................... 202210687778.9

(51) Int. Cl.

*H01R 13/02* (2006.01)
*H01R 4/18* (2006.01)
*H01R 13/115* (2006.01)

(52) U.S. Cl.

CPC ............. *H01R 13/02* (2013.01); *H01R 4/185* (2013.01); *H01R 13/115* (2013.01)

(58) Field of Classification Search

CPC ...... H01R 13/02; H01R 4/185; H01R 13/115; H01R 13/22

See application file for complete search history.

(56) References Cited

U.S. PATENT DOCUMENTS

| | | | | |
|---|---|---|---|---|
| 3,123,431 A * | 3/1964 | Keller | H01R 4/185 | 439/881 |
| 3,771,111 A * | 11/1973 | Pritulsky | H01R 43/058 | 439/867 |
| 6,086,433 A * | 7/2000 | Hils | H01R 4/185 | 439/850 |
| 7,198,526 B1 * | 4/2007 | MacNeil | H01R 4/185 | 439/881 |
| 9,876,292 B1 * | 1/2018 | Jacques | H01R 4/185 | |
| 2004/0257810 A1 * | 12/2004 | Garcia | H01R 33/09 | 362/249.14 |

FOREIGN PATENT DOCUMENTS

GB 908399 A * 10/1962 ............. H01R 4/185

* cited by examiner

*Primary Examiner* — Travis S Chambers

(74) *Attorney, Agent, or Firm* — CANTOR COLBURN LLP

(57) ABSTRACT

A terminal for use with a vehicle latch, including: a main body portion that is integrally formed with a wire insulating engaging portion, a wire engaging portion and a pin engagement portion, wherein the wire insulating engaging portion has an enlarged surface area that extends laterally from the main body portion.

13 Claims, 14 Drawing Sheets

RECEPTACLE TERMINAL

CROSS REFERENCE TO RELATED APPLICATIONS

This application claims priority under 35 U.S.C. § 119 to the following Chinese Patent Application No. 202210687778.9, filed on Jun. 17, 2022, the entire contents of which are incorporated herein by reference thereto.

TECHNICAL FIELD

Exemplary embodiments of the present disclosure pertain to the art of terminals.

BACKGROUND

A terminal is used to link two sources. The terminal can be used for wire retention and conductivity. In some applications, the terminal is required to provide a tighter wire retention and higher current conductivity. Accordingly, it is desirable to provide an improved terminal for the above mentioned applications.

BRIEF DESCRIPTION

Disclosed is a terminal for use with a vehicle latch, including: a main body portion that is integrally formed with a wire insulating engaging portion, a wire engaging portion and a pin engagement portion, wherein the wire insulating engaging portion has an enlarged surface area that extends laterally from the main body portion.

In addition to one or more of the features described above, or as an alternative to any of the foregoing embodiments, the main body portion, the wire insulating engaging portion, the wire engaging portion and the pin engagement portion are all formed from a single unitary structure of conductive material.

In addition to one or more of the features described above, or as an alternative to any of the foregoing embodiments, the wire insulating engaging portion and the wire engaging portion are formed from a material that is both conductive and malleable so that the wire insulating engaging portion and the wire engaging portion can be crimped about a wire inserted therein.

In addition to one or more of the features described above, or as an alternative to any of the foregoing embodiments, the wire insulating engaging portion is a planar member that has an enlarged width as opposed to a width of the main body portion and the pin engagement portion in order to provide a robust securement to insulation of a wire secured therein.

In addition to one or more of the features described above, or as an alternative to any of the foregoing embodiments, the wire engaging portion includes two members that are configured to engage an uninsulated portion of the wire to be secured in the terminal.

In addition to one or more of the features described above, or as an alternative to any of the foregoing embodiments, the pin engagement portion includes two members that are configured to engage a terminal.

In addition to one or more of the features described above, or as an alternative to any of the foregoing embodiments, the wire insulating engaging portion and the wire engaging portion are formed from a material that is both conductive and malleable so that the wire insulating engaging portion and the wire engaging portion can be crimped about a wire inserted therein.

In addition to one or more of the features described above, or as an alternative to any of the foregoing embodiments, the wire insulating engaging portion is a planar member that has an enlarged width as opposed to a width of the main body portion and the pin engagement portion in order to provide a robust securement to insulation of a wire secured therein.

In addition to one or more of the features described above, or as an alternative to any of the foregoing embodiments, the wire engaging portion includes two members that are configured to engage an uninsulated portion of the wire to be secured in the terminal.

In addition to one or more of the features described above, or as an alternative to any of the foregoing embodiments, the pin engagement portion includes two members that are configured to engage a terminal.

In addition to one or more of the features described above, or as an alternative to any of the foregoing embodiments, the wire insulating engaging portion has a width "W" of 4.03 mm and the enlarged surface area of the wire insulating engaging portion extends laterally from the main body portion by a distance "X" of 1.4 mm.

In addition to one or more of the features described above, or as an alternative to any of the foregoing embodiments, the wire insulating engaging portion has a width "W" in a range of 3.5 mm to 4.5 mm and the enlarged surface area of the wire insulating engaging portion extends laterally from the main body portion by a distance "X" in a range of 1.0 mm to 1.8 mm.

In addition to one or more of the features described above, or as an alternative to any of the foregoing embodiments, the wire insulating engaging portion has a width "W" in a range of 3.8 mm to 4.2 mm and the enlarged surface area of the wire insulating engaging portion extends laterally from the main body portion by a distance "X" in a range of 1.2 mm to 1.6 mm.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
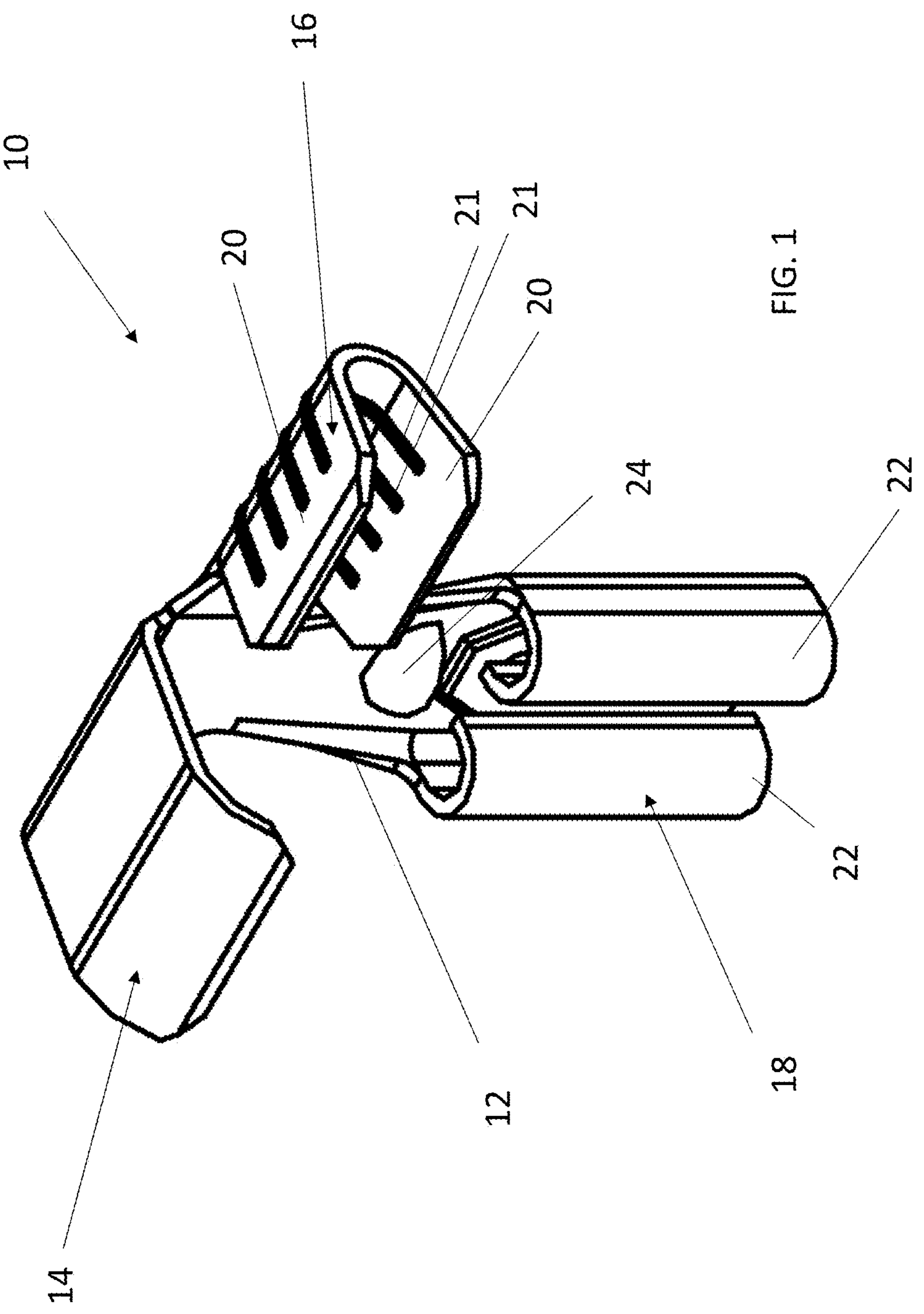
FIG. 1 is a perspective view of a terminal in accordance with the present disclosure.
Figure 2:
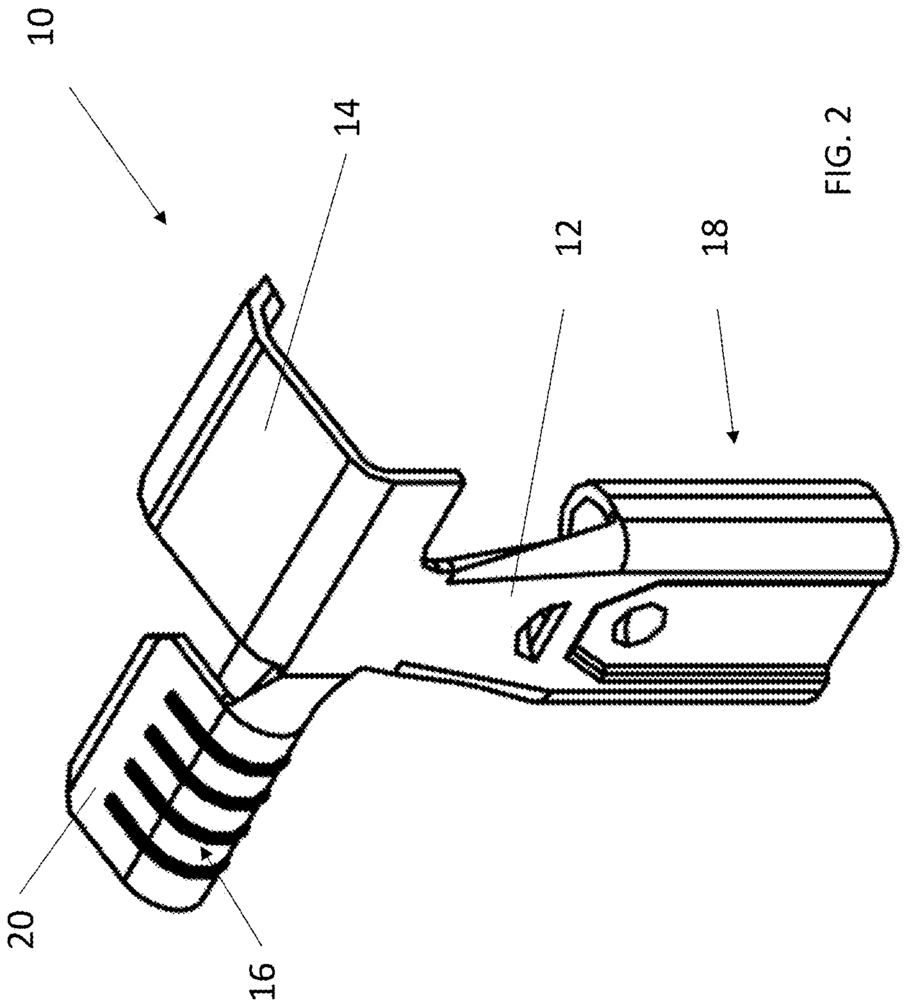
FIG. 2 is another perspective view of a terminal in accordance with the present disclosure.
Figure 3:
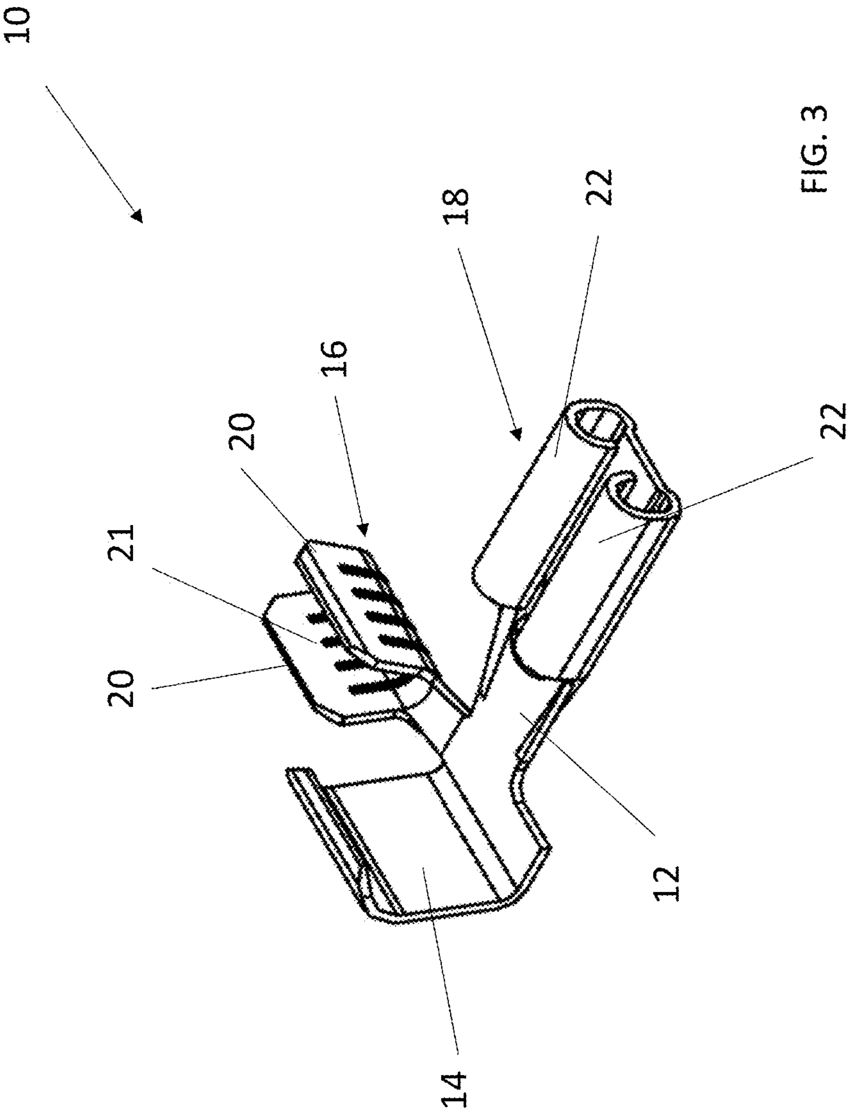
FIG. 3 is yet another perspective view of a terminal in accordance with the present disclosure.
Figure 4:
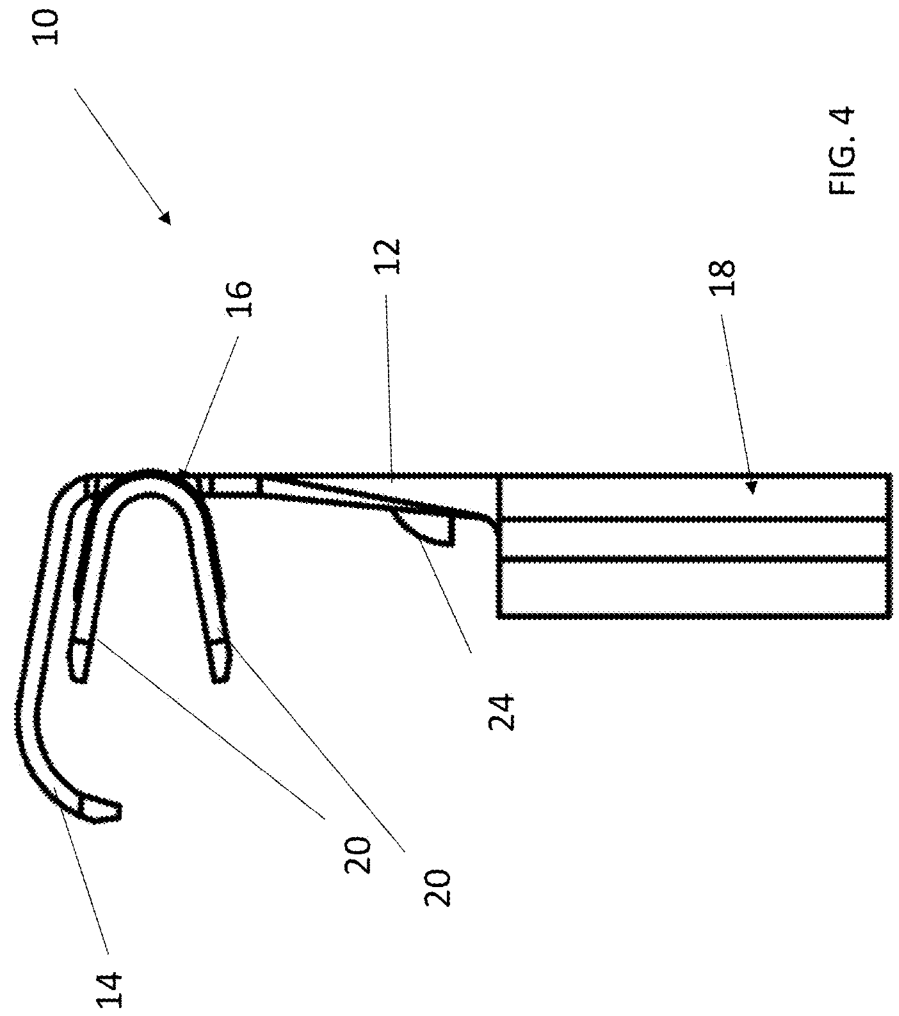
FIG. 4 is a side view of a terminal in accordance with the present disclosure.
Figure 5:
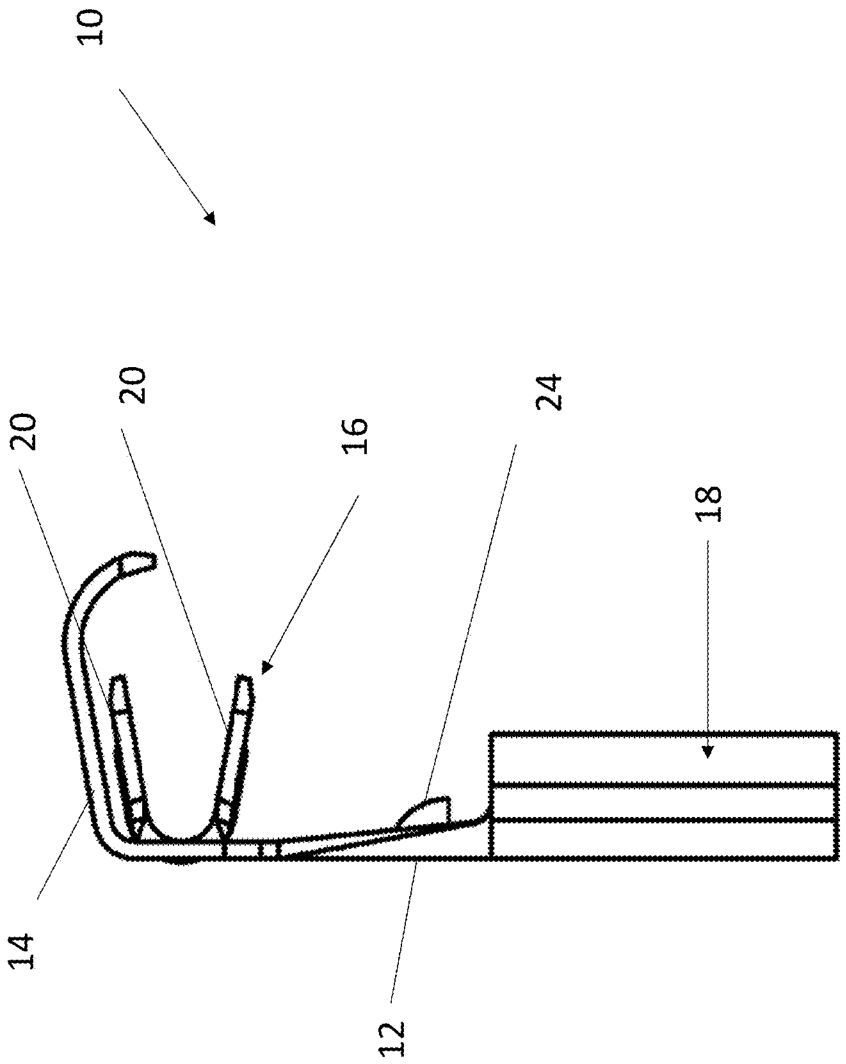
FIG. 5 is another side view of a terminal in accordance with the present disclosure.
Figure 6:
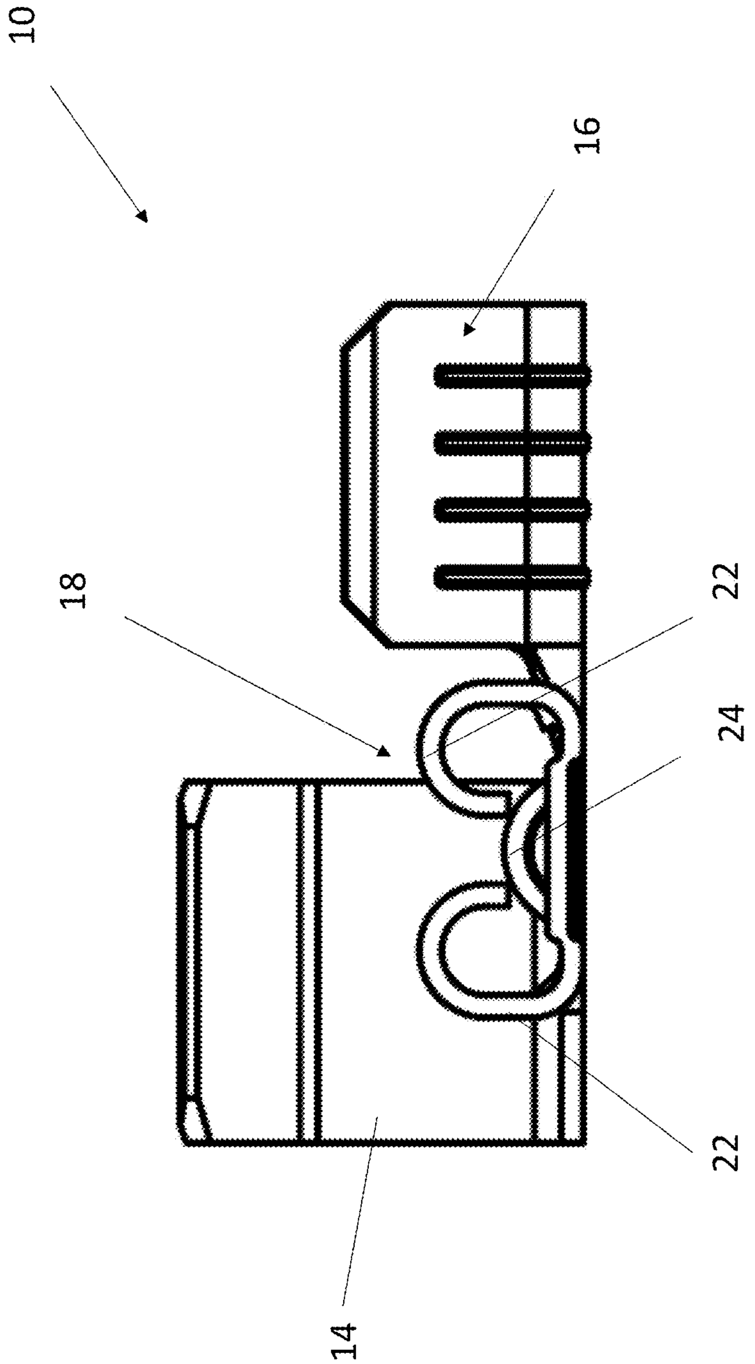
FIG. 6 is a bottom view of a terminal in accordance with the present disclosure.
Figure 7:
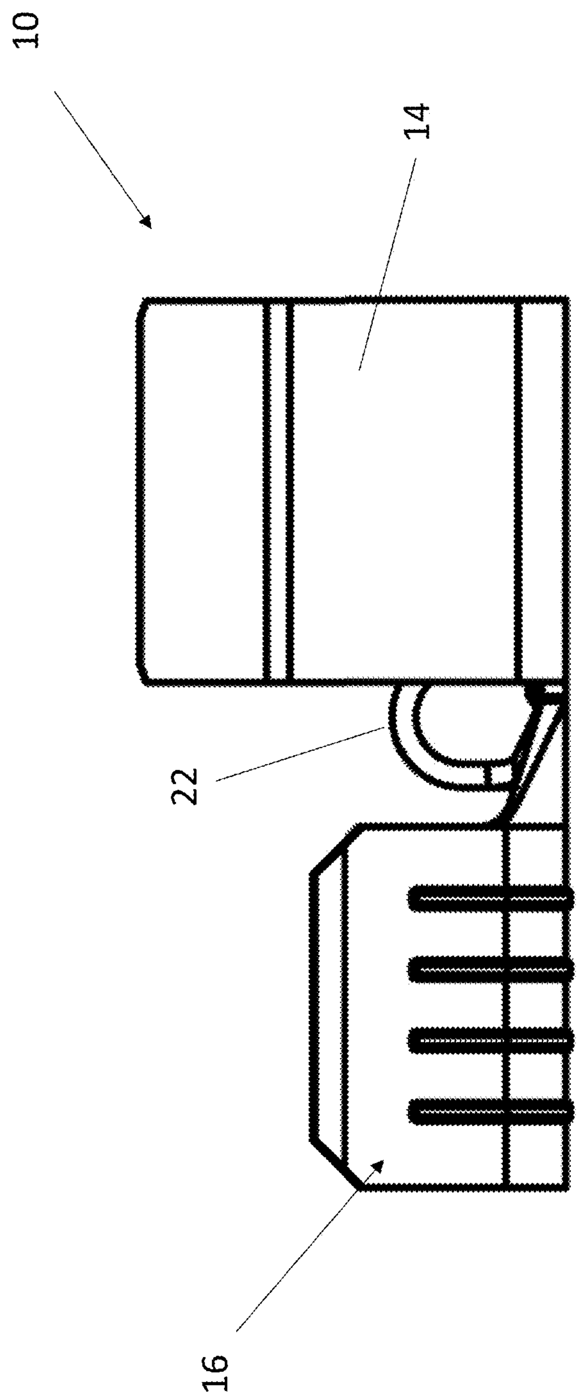
FIG. 7 is a top view of a terminal in accordance with the present disclosure.
Figure 8:
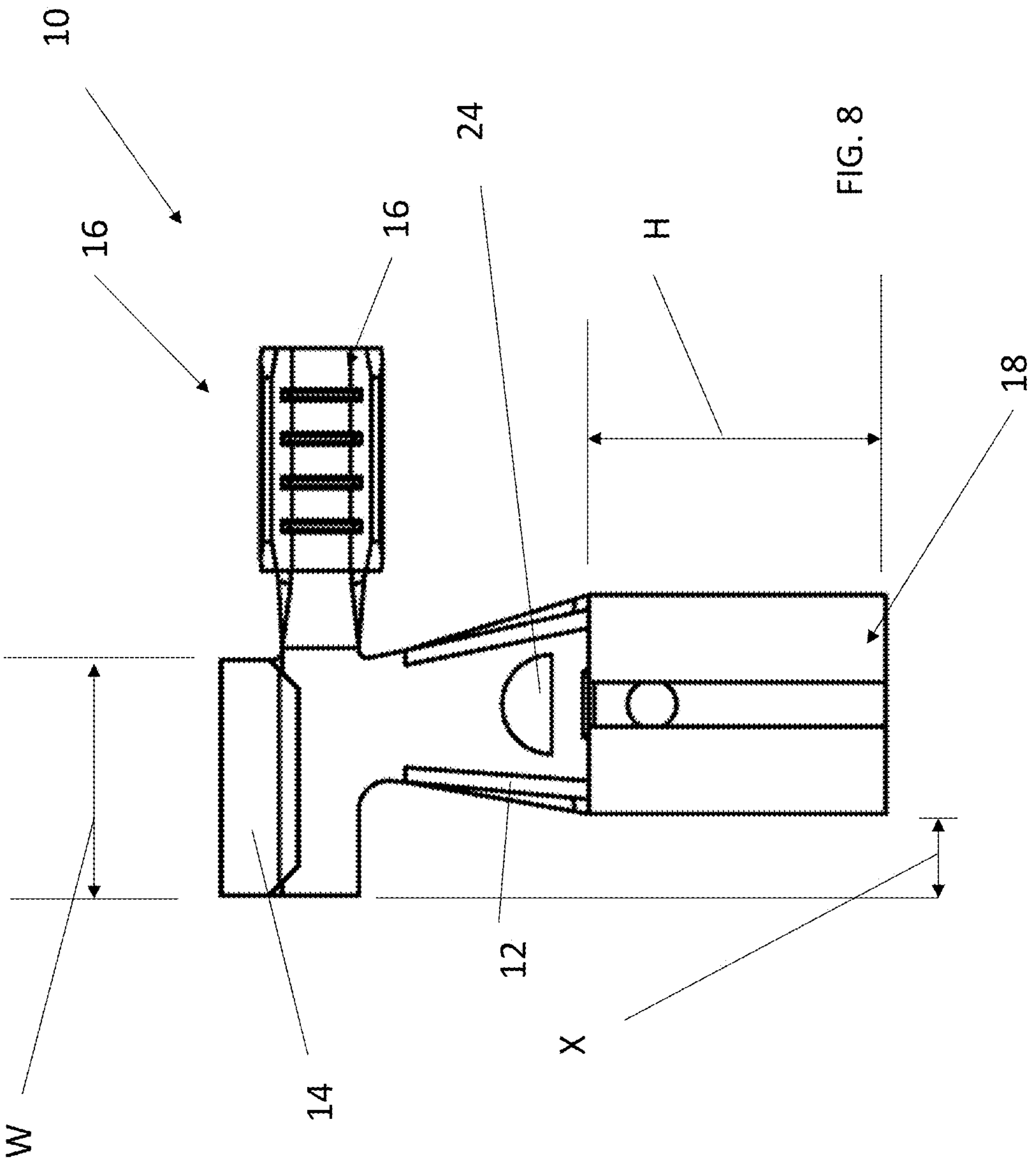
FIG. 8 is a front view of a terminal in accordance with the present disclosure.
Figure 9:
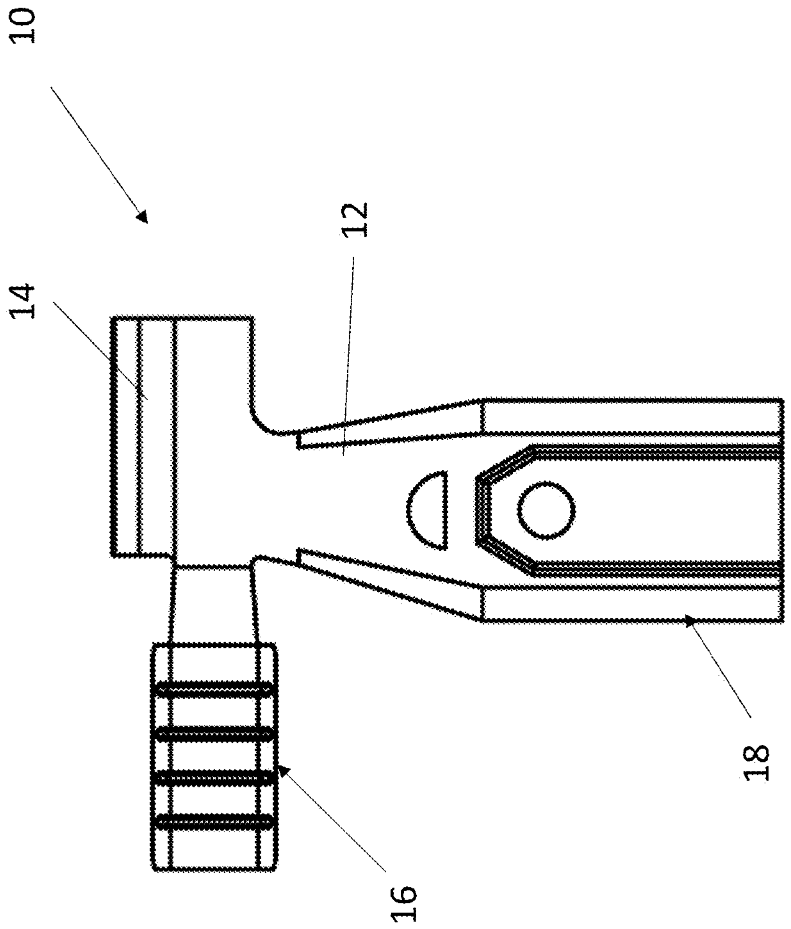
FIG. 9 is a rear view of a terminal in accordance with the present disclosure.
Figure 10:
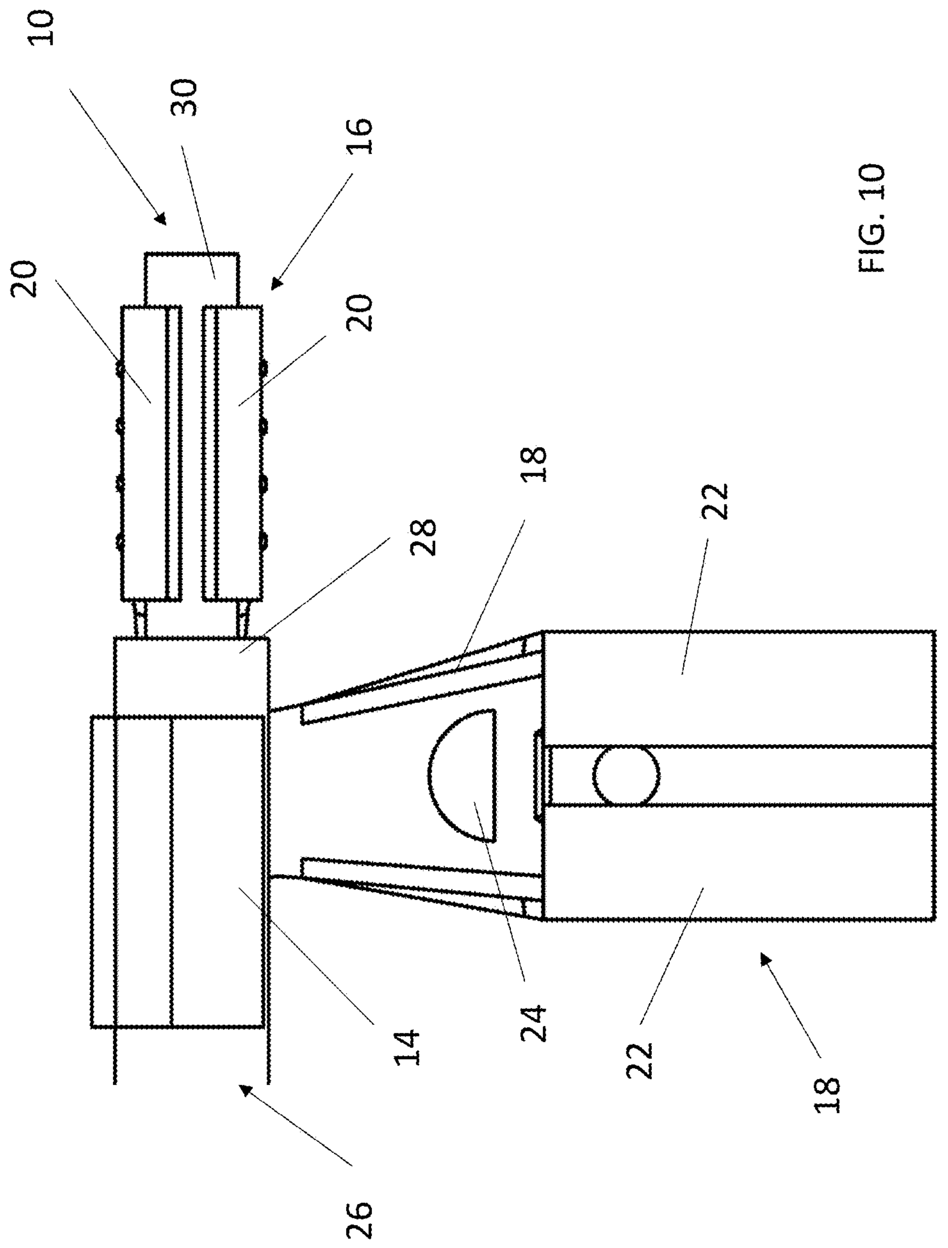
FIG. 10 is a front view of the terminal secured to a wire in accordance with the present disclosure.
Figure 11:
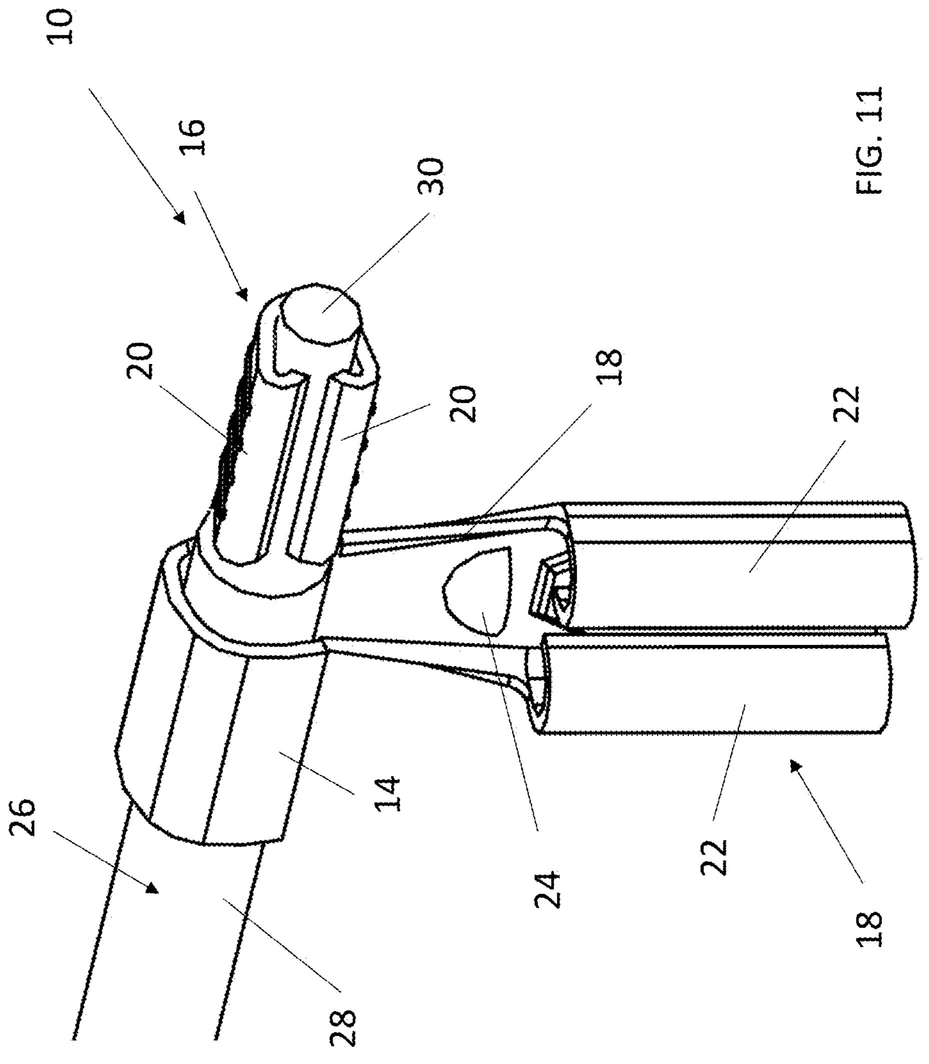
FIG. 11 is a front view of the terminal secured to a wire in accordance with the present disclosure.
Figure 12:
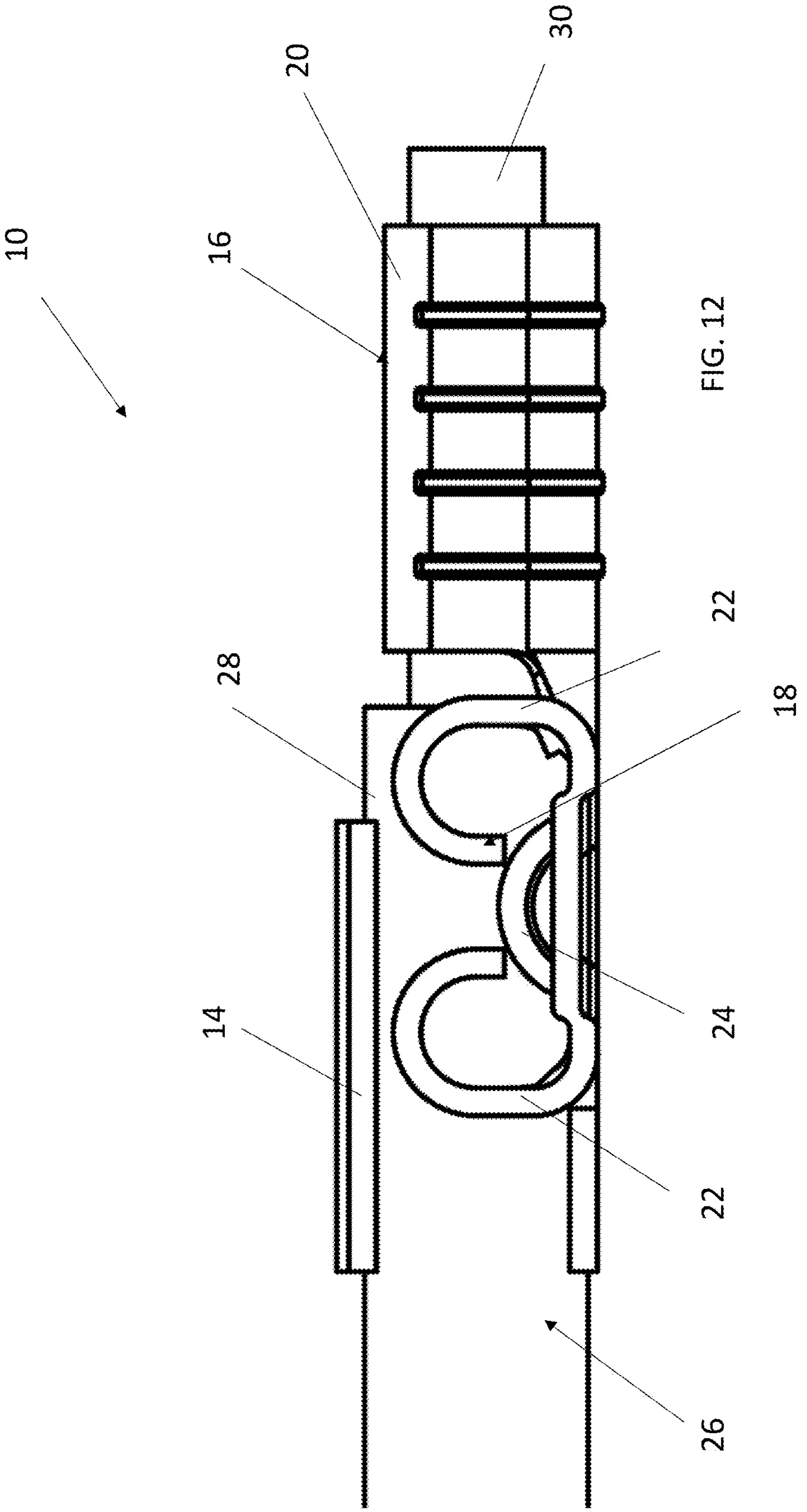
FIG. 12 is a bottom view of the terminal secured to a wire in accordance with the present disclosure.
Figure 13:
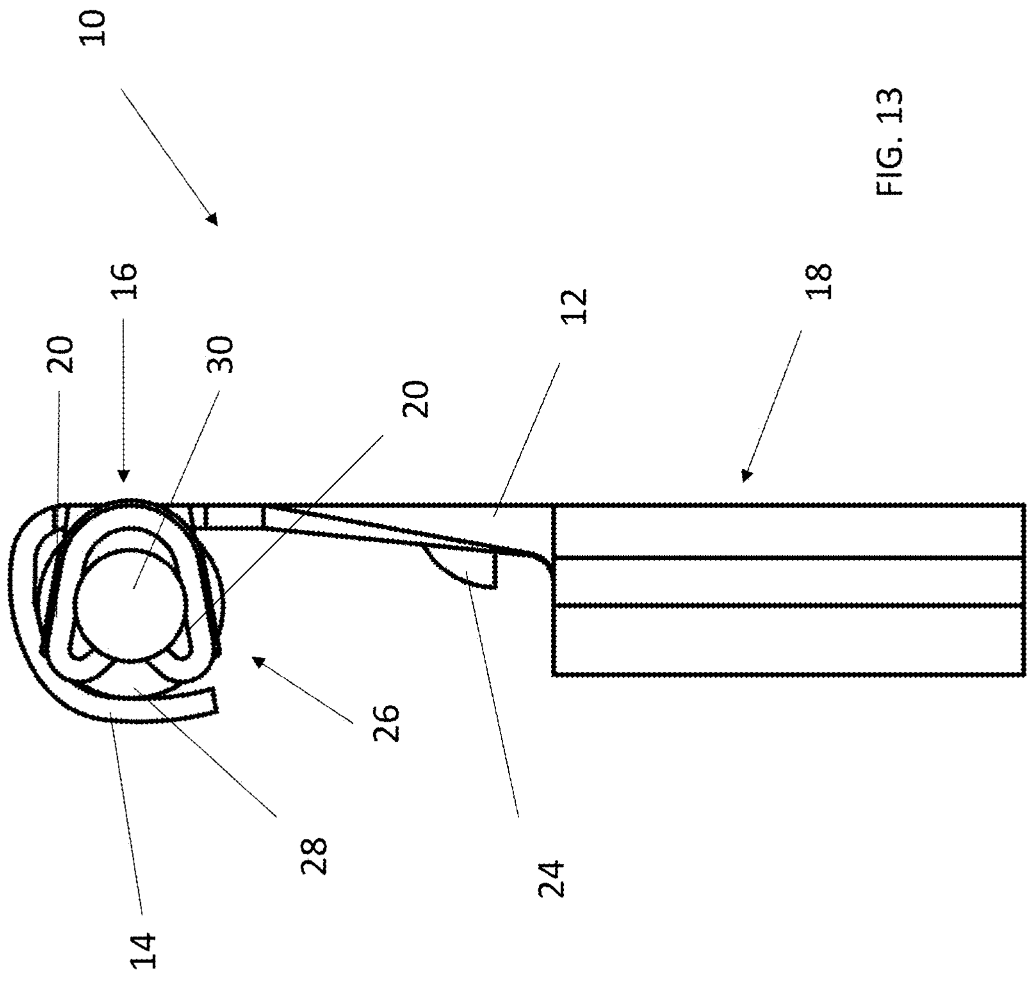
FIG. 13 is a side view of the terminal secured to a wire in accordance with the present disclosure.
Figure 14:
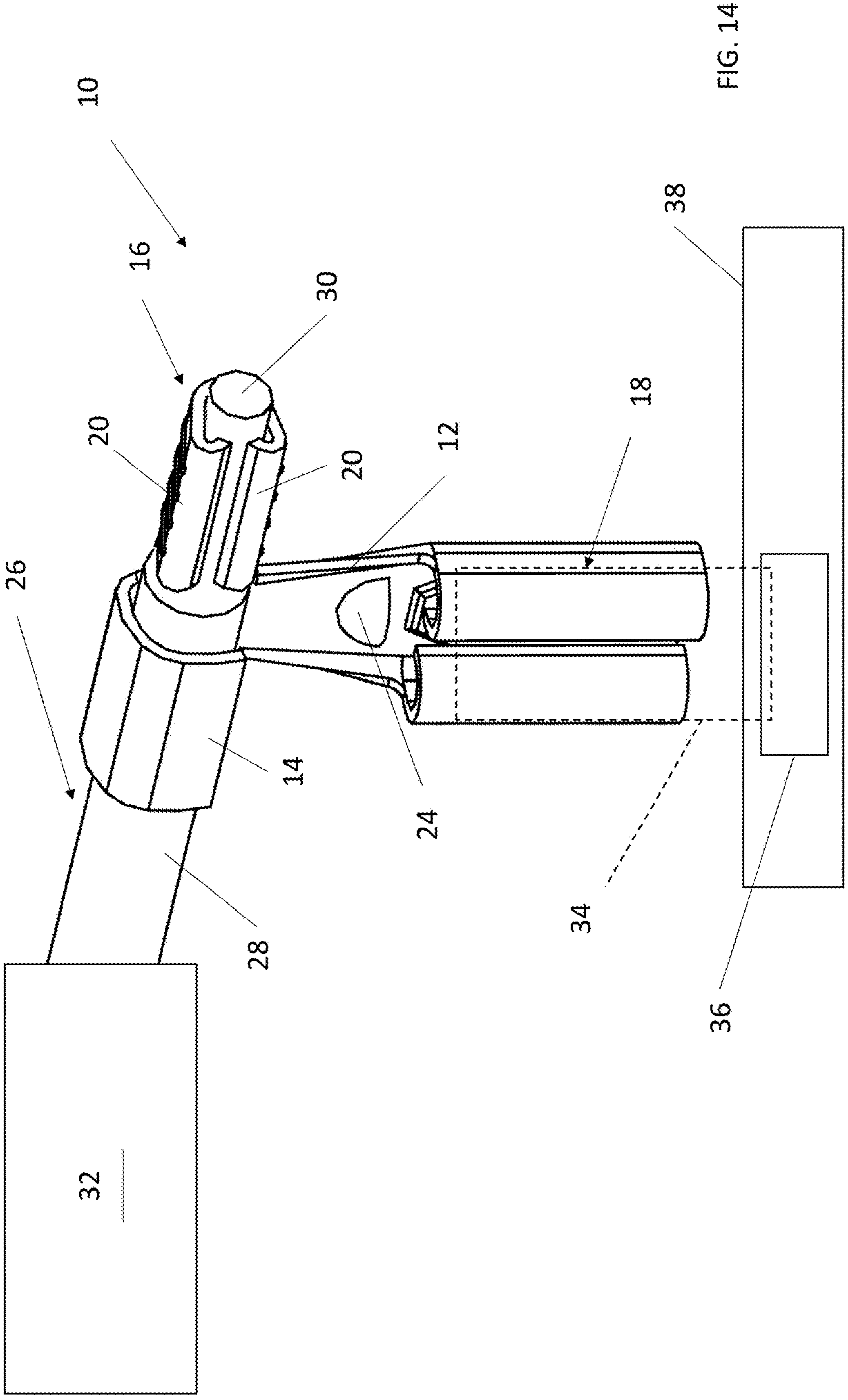
FIG. 14 is a perspective view of the terminal secured to a wire in and a pin in accordance with the present disclosure.

FIGS. 1-3 illustrate perspective views of a terminal 10 in accordance with the present disclosure. FIGS. 4 and 5 are side views of the terminal 10 in accordance with the present disclosure. FIGS. 6 and 7 and bottom and top views of the terminal in accordance with the present disclosure. FIGS. 8 and 9 are front and rear views of the terminal in accordance with the present disclosure. FIGS. 10-14 are various views of the terminal secured to a wire in accordance with the present disclosure.

Referring now to the FIGS. various views of the terminal 10 in accordance with the present disclosure are illustrated. In one non-limiting embodiment, the terminal 10 is used in a vehicle latch 38 (illustrated schematically in FIG. 14). The terminal 10 has a main body portion 12 that is integrally formed with a wire insulating engaging portion 14, a wire engaging portion 16 and a pin engagement portion 18. The main body portion 12, the wire insulating engaging portion 14, the wire engaging portion 16 and the pin engagement portion 18 are all formed from a single unitary structure of conductive material that may be stamped and formed into the illustrated configurations. The conductive nature of the terminal allows a current to be passed between the pin engagement portion 18 and the wire engaging portion 16. In one non-limiting embodiment, the single unitary component may be formed from brass or equivalent materials. For example, a material that is both conductive and malleable so that the wire insulating engaging portion 14 and the wire engaging portion 16 can be crimped about a wire inserted therein. As such, the main body portion 12, the wire insulating engaging portion 14, the wire engaging portion 16 and the pin engagement portion 18 are formed as a single component.

In one embodiment the wire insulating engaging portion 14 is a planar member that has an enlarged width as opposed to the width of the main body portion 12 and the pin engagement portion 18 in order to provide a robust securement to the insulation of a wire secured therein. For example, the wire insulating engaging portion 14 extends a distance "X" from a side of the main body portion 12 that is opposite to a side where the wire engaging portion 16 extends. In one embodiment, this distance "X" is 1.4 mm. In one non-limiting embodiment, this distance "X" is in a range of 1.0 mm to 1.8 mm. In yet another embodiment, this distance "X" is in a range of 1.2 mm to 1.6 mm This allows the wire insulating engaging portion 14 to have a width of "W" which allows for a robust securement to insulating portion of a wire. In one non-limiting embodiment this width "W" is 4.03 mm. In yet another non-limiting embodiment this width "W" is in a range of 3.5 mm to 4.5 mm. In yet another embodiment, the width "W" is in a range of 3.8 mm to 4.2 mm. See at least FIG. 8. This larger area provides a larger area for crimping of a wire on a manufacturing line.

In one embodiment, the wire engaging portion 16 includes two members 20 that are configured to engage an uninsulated portion of a wire to be secured in the terminal 10. In one embodiment, the two members 20 may have ridges 21 that retain an inner conductor or a wire secured thereto. This will allow for a stronger grasping of the wire during a crimping process, which will limit movement of the wire. In addition, the pin engagement portion 18 includes two members 22 that are configured to engage complimentary portions of a pin or blade connector (illustrated schematically in FIG. 14).

Various embodiments of the present disclosure allow for a stamped receptacle terminal 10 to be provided. The terminal allows for the transfer of current between two components (e.g., a power source such as a motor and a wire). As mentioned above, the wire insulating engaging portion 14 is enlarged to a greater width such that is has a greater surface area for retaining a larger surface area of the insulator of the wire.

The terminal 10 also has a feature or half-circle 24 that acts as a stopper to ensure that when a pin terminal is inserted therein it cannot pass beyond an intended height or position. The terminal 10 also has a feature, protrusion or bump that ensures a tight fitting between the pin engagement portion 18 and pin inserted therein, which prevents disengagement of both parts. In addition, the pin engagement portion 18 provides a lifted area or height "H" to create an interference area corresponding to the height "H" between the a pin terminal inserted therein and the pin engagement portion 18. This will create a larger area of contact and higher conductivity. In one embodiment, the pin engagement portion 18 is configured to engage a motor terminal pin of a motor of a vehicle latch.

Referring now to FIGS. 10-13, a wire 26 is shown crimped into the terminal 10. As illustrated, the wire insulating engaging portion 14 is shown crimped around an insulating portion 28 of the wire 26 and the wire engaging portion 16 or the two members 20 are shown crimped around a conducting portion 30 of the wire 26.

Accordingly, the terminal of the present disclosure allows for a more robust securement of a wire 26 to the terminal due to the enlarged the wire insulating engaging portion 14. In one embodiment, the wire is coupled to a power supply 32 (illustrated schematically in FIG. 14) and a terminal 34 (illustrated schematically in FIG. 14) operably coupled to a motor 36 (illustrated schematically in FIG. 14) of a vehicle latch 38 (illustrated schematically in FIG. 14) is secured to the pin engagement portion 18. In one embodiment the terminal 34 may be a pair of pins received in the pin engagement portion 18.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A terminal (10) for use with a vehicle latch (38), the terminal (10) extending along a first direction to define a height (H) and a second direction opposite the first direction to define a width, the terminal comprising:

a main body portion (12) that is integrally formed with a wire insulating engaging portion (14), a wire engaging portion (16) and a pin engagement portion (18), wherein the wire insulating engaging portion (14) has an enlarged surface area that extends laterally from the main body portion (12), the main body portion (12) including a flared profile extending along the first direction between a first portion having a first width extending along the second direction and a second portion having a second width extending along the second direction, the second width being greater than the first width and matching a width extending along the second direction of the pin engagement portion (18).

2. The terminal (10) as in claim 1, wherein the main body portion (12), the wire insulating engaging portion (14), the wire engaging portion (16) and the pin engagement portion (18) are all formed from a single unitary structure of conductive material.

3. The terminal (10) as in claim 1, wherein the wire insulating engaging portion (14) and the wire engaging portion (16) are formed from a material that is both conductive and malleable so that the wire insulating engaging portion (14) and the wire engaging portion (16) can be crimped about a wire (26) inserted therein.

4. The terminal (10) as in claim 1, wherein the wire insulating engaging portion (14) is a planar member that has an enlarged width as opposed to a width of the main body portion (12) and the pin engagement portion (18) in order to provide a robust securement to insulation (28) of a wire (26) secured therein.

5. The terminal (10) as in claim 4, wherein the wire engaging portion (16) includes two members (20) that are configured to engage an uninsulated portion (30) of the wire (26) to be secured in the terminal (10).

6. The terminal (10) as in claim 1, wherein the pin engagement portion (18) includes two members (22) that are configured to engage a terminal (34).

7. The terminal (10) as in claim 2, wherein the wire insulating engaging portion (14) and the wire engaging portion (16) are formed from a material that is both conductive and malleable so that the wire insulating engaging portion (14) and the wire engaging portion (16) can be crimped about a wire (26) inserted therein.

8. The terminal (10) as in claim 7, wherein the wire insulating engaging portion (14) is a planar member that has an enlarged width as opposed to a width of the main body portion (12) and the pin engagement portion (18) in order to provide a robust securement to insulation (28) of a wire (26) secured therein.

9. The terminal (10) as in claim 8, wherein the wire engaging portion (16) includes two members (20) that are configured to engage an uninsulated portion (30) of the wire (26) to be secured in the terminal (10).

10. The terminal (10) as in claim 9, wherein the pin engagement portion (18) includes two members (22) that are configured to engage a terminal (34).

11. The terminal (10) as in claim 1, wherein the wire insulating engaging portion (14) has a width "W" of 4.03 mm and the enlarged surface area of the wire insulating engaging portion (14) extends laterally from the main body portion (12) by a distance "X" of 1.4 mm.

12. The terminal (10) as in claim 1, wherein the wire insulating engaging portion (14) has a width "W" in a range of 3.5 mm to 4.5 mm and the enlarged surface area of the wire insulating engaging portion (14) extends laterally from the main body portion (12) by a distance "X" in a range of 1.0 mm to 1.8 mm.

13. The terminal (10) as in claim 1, wherein the wire insulating engaging portion (14) has a width "W" in a range of 3.8 mm to 4.2 mm and the enlarged surface area of the wire insulating engaging portion (14) extends laterally from the main body portion (12) by a distance "X" in a range of 1.2 mm to 1.6 mm.

* * * * *